Patented Nov. 29, 1949

2,489,655

UNITED STATES PATENT OFFICE 2,489,655

POLYMERIC COLOR FORMERS

Elmore Louis Martin, Wilmington, Del., assignor to E. I. du Pont de Nemours & Company, Wilmington, Del., a corporation of Delaware No Drawing. Application April 5, 1948,
Serial No. 19,155

4 Claims. (Cl. 260—73)

This invention relates to acetals of polymers containing a plurality of recurring intralinear

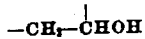

groups. More particularly it relates to acetals of such polymers with m-(3-methylsalicylamido)-benzaldehyde.

An object of this invention is to provide new and useful acetals. A further object is to provide new polymeric acetals which have improved properties when used as color formers in the color-coupling development of silver salt images. Still other objects will be apparent from the following description of the invention.

The new chemical compounds of this invention are acetals of m-(3-methylsalicylamido)benzaldehyde with high-molecular weight hydroxyl polymers which contain a sufficient amount of recurring intralinear vinyl alcohol

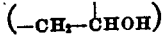

polymer-forming unit groups to render the polymer molecule water soluble or hydrophilic in character. The resulting acetals are also water soluble or hydrophilic in character, and have from 0.75% to 7.5% of the intralinear hydroxyl groups acetalized with this aldehyde.

The polymeric acetals of this invention can be prepared as follows: A suspension of the hydroxyl polymer, e. g., polyvinyl alcohol and m-(3-methylsalicylamido)benzaldehyde ethylene glycol acetal in ethylene glycol having dissolved therein a small proportion of an acidic catalyst, e. g., phosphoric acid, is heated with agitation at 60° C. to 80° C. for a period of 0.5 to 25 hours and the resulting acetal of polyvinyl alcohol with m-(3-methylsalicylamido)benzaldehyde is then isolated. The isolation is accomplished by the addition of an ethylene glycol miscible solvent which is not a solvent for the polymeric acetal, e. g., acetone or methanol, followed by filtration and, if desired, by washing with the solvent.

In order to obtain a polyvinyl acetal whose color and solubility do not change on standing, it is desirable to treat the slurry of the polyvinyl acetal color former with a compound capable of neutralizing the acid catalyst. Suitable compounds for this process include alkoxides, alkali metal hydroxides, bicarbonates and carbonates; ammonia and its mono-, di-, and trialkyl substituted compounds, such as methylamine, dimethylamine, ethylamine, triethylamine, triethanolamine, etc.; heterocyclic bases, such as quinoline, pyridine, etc. The quantity of neutralizing agent added to the suspension should be sufficient to bring the pH to a value of about 6 to 8, preferably 7.5. The acid neutralizing compound may be dissolved in the solvent used during the dilution of the ethylene glycol reaction mixture, or may be added during any of the subsequent slurrying steps.

Other suitable acid catalysts for use in the acetalization of polyvinyl alcohol in ethylene glycol include inorganic acids, such as sulfuric acid, hydrochloric acid, and organic acids, such as chloroacetic acid, formic acid, methane sulfonic acid, para-toluene-sulfonic acid, etc.

The m-(3-methylsalicylamido)benzaldehyde ethylene glycol acetal is a colorless, crystalline compound which has a melting point of 134 to 135° C. It forms the subject matter of application Serial Number 13,523, filed March 6, 1948, and can be made after the manner disclosed in said application and as follows:

To a mechanically stirred suspension of 46 parts of 3-methylsalicylic acid in 120 parts of thionyl chloride there was added dropwise 1.5 parts of pyridine. After stirring at 25° C. for 1.5 hours, a homogeneous solution was obtained. The excess thionyl chloride was removed under reduced pressure and the acid chloride was dissolved in 60 parts of anhydrous dioxane and was added dropwise to a mechanically stirred mixture of 52 parts of potassium carbonate, 50 parts of m-aminobenzaldehyde ethylene glycol acetal, 200 parts of water and 60 parts of acetone maintained at 0° C. by means of external cooling. After dilution with water, the colorless crystals were collected, washed with cold water, and air dried. Crystallization of the compound from methylene chloride gave 68 parts of colorless crystals melting at 134–135° C.

Anal. Calc'd. for $C_{17}H_{17}O_2N$: C, 68.20, H, 5.73, N, 4.68. Found: C, 68.20, 67.98; H, 5.58, 5.85; N, 5.2.

The use of ethylene glycol as a reaction medium for the preparation of polyvinyl acetal color formers is disclosed and claimed in Martin U. S.

application Serial Number 722,931 filed January 16, 1947.

The acetals may be further modified by the addition of other acetal groups. Thus, in order for thin layers of the acetals to be more readily permeable to photographic processing solutions, the hydroxyls of the polyvinyl alcohol are acetalized with an aldehydoacid, e. g., ortho-sulfobenzaldehyde, phthalaldehydic acid, glyoxylic acid, and the like or their alkali metal salts. Polymeric acetals having from 0.1 to 5% of the hydroxyls of polyvinyl alcohol acetalized with aldehydoacids or their alkali metal salts are suitable. When the preferred ortho-sulfobenzaldehyde is used, the percentage of the hydroxyls of the polyvinyl alcohol acetalized with this aldehyde may suitably be as high as 4% when 7.5% of the hydroxyls are acetalized by color-forming aldehydes. At lower color-former substitutions, correspondingly lower aldehydoacid substitutions are appropriate. The aldehydoacid groups are preferably present in the form of their alkali metal salts, e. g., the sodium salt.

The following examples further illustrate the invention but are not intended to limit it in any way.

*Example I*

To 67 parts of ethylene glycol there was added 1 part of 92% phosphoric acid and to the resulting solution was added a mixture of 2 parts of m - (3 - methylsalicylamido)benzaldehyde ethylene glycol acetal, 1 part of o-sulfobenzaldehyde sodium salt, and 10 parts of polyvinyl alcohol. The resulting mixture was stirred at 67° C. for 1 hour, cooled slightly, and a mixture of 2 parts of triethylamine in 100 parts of methanol was added. The mixture was filtered, the filter cake was washed with methanol, and then slurried for 0.5 hour with 150 parts of methanol. The mixture was filtered and the above processes repeated twice. The resulting colorless polyvinyl acetal was readily soluble in 20% aqueous ethanol but insoluble in dilute caustic, hot dimethylaniline and hot water. This polyvinyl acetal has 5.8% of the polyvinyl alcohol hydroxyl groups substituted with m-(3-methylsalicylamido) benzaldehyde and an additional 3.9% of the polyvinyl alcohol hydroxyl groups substituted with o-sulfobenzaldehyde. Addition of a small amount of alkaline p-aminodiethylaniline to a test portion of a solution of the above acetal followed by the addition of an aqueous solution of potassium ferricyanide resulted in a strong blue-green solution of the polyvinyl acetal.

*Example II*

To a solution of 1300 parts of ethylene glycol containing 18 parts of 92% phosphoric acid heated to 69° C. there was added rapidly a mixture of 200 parts of polyvinyl alcohol, 40 parts of m-(3 - methylsalicylamido)benzaldehyde ethylene glycol acetal, 18 parts of o-sulfobenzaldehyde sodium salt, and the resulting mixture was heated with stirring at 65° C. until a portion indicated complete reaction of the monomeric ethylene glycol acetal with the polyvinyl alcohol as determined by the following test. A 1 cc. portion of the reaction mixture was removed from the reaction flask, 1 cc. of ethanol was added, followed by the addition of 1 drop of 10% potassium hydroxide solution and 1 cc. of water. The resulting mixture was heated until a homogeneous solution was obtained. The solution was cooled to 25° C. and diluted with 20 cc. of water. Under the above reaction conditions the test portions removed after reaction periods of 5, 15, 30, and 45 minutes showed decreasing amount of unreacted m-(3 - methysalicylamido)benzaldehyde ethylene glycol acetal whereas test portions removed after 60 and 75 minutes showed only traces of unreacted monomeric acetal. At the end of 60 minutes a completely homogeneous solution was obtained after dilution with water and the reaction was judged complete.

The main reaction mixture was then cooled to 45° C. and a solution of 40 parts of triethylamine in 400 parts of methanol was added. An additional 700 parts of methanol was added, the reaction mixture was filtered, and the filter cake was washed with methanol and slurried with 1000 parts of methanol for 0.5 hour. The mixture was filtered and the slurrying with methanol was repeated twice. After air drying, the yield of colorless polyvinyl acetal was 226 parts and it possessed solubility and color-forming characteristics similar to the product described in Example I. The polyvinyl acetal has 5.8% of the polyvinyl alcohol hydroxyl groups substituted with m-(3-methylsalicylamido) benzaldehyde and an additional 3.5% of the polyvinyl alcohol hydroxyl groups substituted with o-sulfobenzaldehyde.

*Example III*

To a solution of 0.9 part of 85% phosphoric acid in 75 parts of ethylene glycol there was added a mixture of 0.5 part of m-(3-methylsalicylamido)benzaldehyde ethylene glycol acetal, 0.05 part of o-sulfobenzaldehyde sodium salt, and 10 parts of polyvinyl alcohol, and the mixture was stirred at 66° C. for 2 hours. The color-forming polyvinyl acetal was isolated as described in Example II and was soluble in 20% aqueous alcohol but insoluble in dilute caustic, hot dimethylaniline, or hot water. This resulting polyvinyl acetal has 1.7% of the hydroxyl groups substituted with m-(3-methylsalicylamido)benzaldehyde and an additional 0.2% of the hydroxyl groups substituted with o-sulfobenzaldehyde.

The synthetic hydroxyl polymers which can be used in the preparation of the color-forming polyvinyl acetals of this invention include hydroxyl polymers prepared by polymerizing a vinyl ester, e. g., vinyl acetate, vinyl propionate, vinyl benzoate, etc., alone or with minor proportions, i. e., 10% or less, of an unsaturated copolymerizable monomer, followed by partial or complete hydrolysis and, if desired, by further reaction to introduce minor proportions of other modifying groups, e. g., acetal, ester, or ether groups. Such hydroxyl polymers have a linear chain consisting mainly of

units. Unmodified polyvinyl alcohol is the preferred hydroxyl polymer for forming the color-forming polyvinyl acetals of this invention and especially polyvinyl alcohol having a viscosity of 20–30 centipoises in 4% aqueous solution at 20° C.

The compounds of this invention are polymeric acetals of polyvinyl alcohol and m-(3-methylsalicylamino) benzaldehyde which have 0.75 to 7.5% of the hydroxyls of polyvinyl alcohol acetalized with this aldehyde. These polymeric compounds are amorphous, high molecular weight solids which are insoluble in dilute caustic, hot dimethylaniline, and hot water, are soluble in 10–40% aqueous ethanol and have permeability in thin layers of photographic elements to the various photographic processing solutions in color development sufficiently rapid for practical application.

As illustrated in the examples, an advantageous modification of the invention is obtained when acidic salt-forming groups are introduced into the polymeric acetal by reaction of the polyvinyl alcohol or partial polyvinyl acetal thereof with aldehydes containing carboxylic or sulfonic acid groups. In addition to the o-sulfobenzaldehyde of the examples, which is the preferred aldehydoacid, suitable compounds include phthalaldehydic acid, glyoxalic acid, and propionaldehyde-β-sulfonic acid. Desirably, from 0.1% to 5% of the hydroxyls are acetalized with the aldehydoacids when these are present in the molecule.

The polyvinyl acetals of this invention find uses as the sole binders for light-sensitive silver halides for photographic color films. They may also be added to gelatin or other colloid silver halide emulsions as high molecular weight or immobile color formers. If less than 0.75% of the hydroxyls of the polyvinyl alcohol are acetalized, there are insufficient color-forming groups present to give sufficient color strength in a photographic color film. This permits a theoretical top color density of only 1.8 in a film having a thickness of 5 microns (a practical coating thickness for multilayer films) even if conversion of the color former to the dye is quantitative. This color density represents the lower limit of practical usefulness. When more than 7.5% of the hydroxyls of the polyvinyl alcohol are acetalized, the permeability of the layer to the various solutions used to process the color-forming photographic film becomes too low for practical application. The polyvinyl acetals falling within the range of this invention are outstanding with respect to top color density, light stability and spectral characteristics in the blue-green range on color development with p-phenylenediamine-type developers.

These polymers can also be converted to dyes by coupling with aromatic diazonium salts. Polymeric dyes produced in this way or by color coupling are useful as pigments or in surface coloration of textile fibers.

As many widely different embodiments of this invention can be made without departing from the spirit and scope thereof, it is to be understood that the invention is not to be limited except as defined by the claims.

What is claimed is:
1. A polyvinyl acetal of a hydroxyl polymer which contains a plurality of recurring

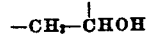

groups and groups of the formula

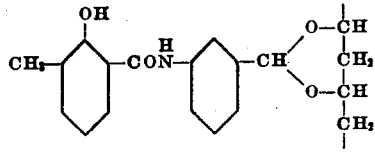

2. A polyvinyl acetal of a hydroxyl polymer which contains a plurality of recurring

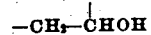

groups, groups of the formula

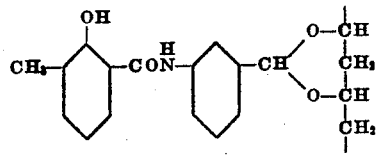

and acetal groups containing solubilizing groups taken from the class consisting of carboxylic acid and sulfonic acid groups and their alkali metal and ammonium salts.

3. An acetal of polyvinyl alcohol with m-(3-methylsalicylamido)benzaldehyde in which 0.75 to 7.5% of the hydroxyl groups of the polyvinyl alcohol are acetalized with said aldehyde.

4. An acetal of polyvinyl alcohol with m-(3-methylsalicylamido)benzaldehyde in which 0.75 to 7.5% of the hydroxyl groups of the polyvinyl alcohol are acetalized with said aldehyde, and 0.1% to 5% are acetalized with sodium o-benzaldehyde sulfonate.

ELMORE LOUIS MARTIN.

REFERENCES CITED

The following references are of record in the file of this patent:

UNITED STATES PATENTS

| Number | Name | Date |
| --- | --- | --- |
| 2,380,032 | Dorough | July 10, 1945 |
| 2,423,572 | Woodward | July 9, 1947 |